April 21, 1959
F. O. WHIPPLE
2,883,322
PRESERVATIVE CELLULOSIC PRODUCT FOR FRUITS
AND PROCESS OF MAKING THE SAME
Filed May 31, 1957
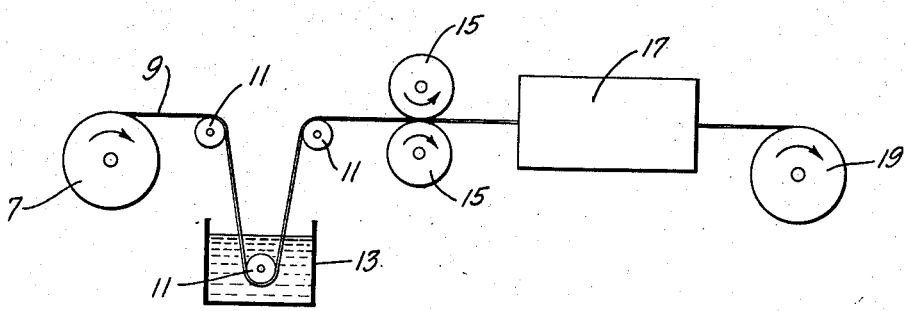
FIG_1_
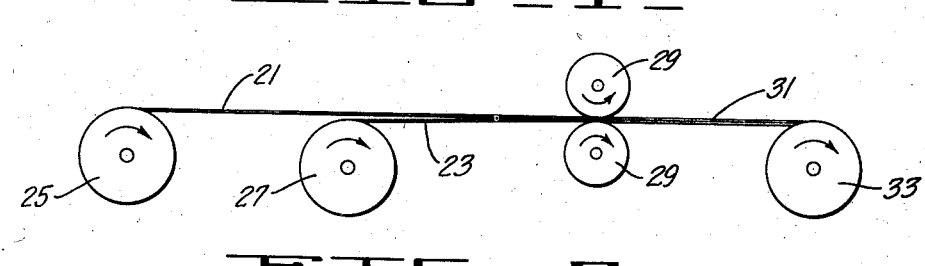
FIG_2_
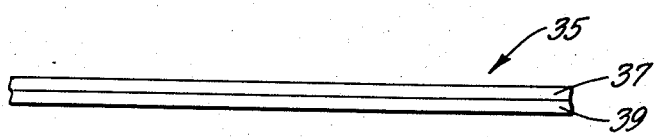
FIG_3_
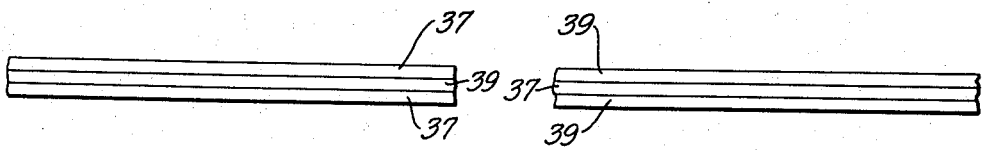
FIG_4_    FIG_5_
INVENTOR.
Francis O. Whipple
BY ECKHOFF & SLICK, Attys.
A member of the firm.

United States Patent Office 2,883,322
Patented Apr. 21, 1959

2,883,322

PRESERVATIVE CELLULOSIC PRODUCT FOR FRUITS AND PROCESS OF MAKING THE SAME

Francis O. Whipple, Washougal, Wash., assignor to Crown Zellerbach Corporation, a corporation of Nevada Application May 31, 1957, Serial No. 662,626

16 Claims. (Cl. 167—39)

This invention relates to a chemically-treated, preservative cellulosic product especially adapted by use in the control of mold growth on fruits or vegetables.

More specifically, this invention relates to the production of a specially treated, flexible paper product suitable for use as a wrapper having the property of efficiently preserving fruits from depreciation in quality and protect them against mold infection during a period of time required for storage and shipment to the seller.

Although the special paper product of the present invention is suitable for use in conjunction with all fruits and vegetables susceptible to molding, the following description will refer specifically to its adaptation to the citrus fruit industry.

Many attempts have been made in developing a suitable fungistatic packaging material for citrus fruits, which would protect them from spoilage due to mold growth. A large number of chemical compounds, including essential oils, benzoates, salacilates and other organic compounds have been proposed for use on citrus fruit wrappers, but found unsatisfactory. Diphenyl is the only substance which has been employed commercially in the prevention of rotting of oranges by green and/or blue molds and it has been employed in vapor phase in fruit storage chambers or applied to tissue or other papers or various types of containers used in packaging fruit. However, the use of diphenyl has been recently curtailed because of its inherent odor and certain degree of toxicity which have been found objectionable.

An attempt has been also made to impregnate paper with unstable ammonium salts, i.e. salts of weak acids, such as boric or carbonic acid, for packaging foods in general. However, such salts have not proved to be satisfactory, since most of the ammonia available, if not all, is released during impregnation of the paper, and consequently the treated paper is ineffective in the control of mold growth on fruits over the period of time required for their packing and storage.

Finally, the use of gaseous ammonia or ammoniated pellets was recently suggested as a substitute for diphenyl, but neither was considered satisfactory. The treatment with ammonia gas would have to be necessarily limited to fruits totally enclosed in a sealed chamber, and thus it could not be applied to conventional handling of fruit in carton boxes. The pellets, formed from a mixture of an ammonium salt with an alkali, have been tried by placing them in shipping cartons containing citrus fruit. Moisture from the respiration of fruit caused the two chemicals to react and produce ammonia gas. This method of preserving fruit was found objectionable, however, since pellets have been mistaken for candy and eaten by children, local high concentrations of ammonia have developed within the carton thus causing injury to the fruit exposed thereto, and reaction between the two chemicals included in pellets started as soon as pellet was formed thus releasing certain amount of ammonia prior to their actual use in conjunction with fruits.

The principal object of the present invention is to provide a new preservative fibrous cellulosic product for fruits and vegetables susceptible to molding, which product will be capable of controlling or inhibiting mold growth during the shipment or storage thereof.

Another object of the invention is to provide a chemically-treated, paper product together with a novel process of making the same for preserving packaged fruits, especially citrus fruits, during transit, which paper product can be produced easily and economically on conventional papermaking and converting equipment.

Briefly, these objects and other advantages are attained by first treating a sheet with an aqueous solution of a stable ammonium salt, then treating another sheet with an aqueous solution of an alkaline compound capable of liberating ammonia from the ammonium salt in the presence of moisture, drying both sheets, and bringing their faces together in contact with each other. The treated sheets form a cellulosic product which, when inserted in a fruit shipping container, gradually releases ammonia in relatively small, non-toxic amounts sufficient to protect the fruit from damage due to mold growth and, in addition, serve as a cushioning pad to prevent damage to the fruit due to rough handling in transit.

The base sheets employed in the herein described fibrous cellulosic product may be fabricated from paper or cloth. Preferably, the base sheets comprise paper sheets, particularly absorbent paper toweling, which may be brought together in contact with each other to form a pad composed of two or more treated sheets to be used as a wrapper for individual fruits, as a liner for various types of containers, as the innermost ply in a multiwall paper bag, or as a liner for railroad cars or trucks.

Where paper is employed as a base sheet, it should be fairly absorbent and have sufficient strength to allow the treatment with aqueous chemical solutions. If desired, its physical properties may be further enhanced by the inclusion of wet-strength resins, starch, or other conventional pulp additives. Particularly suitable are creped toweling sheets made from a mixture of bleached or unbleached chemical and groundwood pulps.

The basis weight of the paper sheet employed herein may vary over a broad range of from about 10 to 200 pounds per ream (3000 square feet). It is preferred, however, to employ sheets having a basis weight of from about 25 to 75 pounds per ream.

One of the foregoing or other suitable cellulosic sheets is treated with an aqueous solution of a stable ammonium salt by a conventional impregnation, saturation or coating procedure. Stable ammonium salts which are suitable in the practicing of this invention are those salts of ammonia which do not release ammonia when in contact with moisture such as those derived from strong inorganic or organic acids having a dissociation constant greater than $1 \times 10^{-2}$. These include sulfates, chlorides, nitrates, phosphates, oxalates, maleates, dichloroacetates, trichloroacetates and others. Salts of weak acids, such as borates, carbonates, acetates and the like are not suitable since they decompose per se under normal atmospheric conditions or in aqueous solutions, thus releasing available ammonia prematurely.

The other base sheet is treated in the same manner with an aqueous solution containing an alkaline compound capable of reacting with any of the foregoing stable ammonium salts to liberate ammonia therefrom in the presence of moisture. Suitable alkaline compounds comprise water-soluble metal salts and bases which form alkaline-reacting aqueous solutions. Particularly suitable compounds for this purpose comprise sodium and potassium salts of weak acids, such as of the carbonic or boric acid, as well as their oxides or hydroxides.

It will be understood that the concentration of the ammonium salt or the alkaline compound in water must be such that the solution will not cause disintegration of the base sheet in the course of its treatment or after it has been treated. In general, whenever possible, the maximum concentration may be as high as that of a saturated solution. If desired, the chemicals may be dissolved in warm or hot water in order to increase the concentration of their solution.

The foregoing solutions may be applied separately to each sheet of paper or other suitable base sheet on any conventional equipment. Where a paper impregnator is employed, a continuous web is passed through a bath of the chemical solution, the excess of the solution is squeezed out, and the impregnated web is substantially dried by hot air or any other suitable means until its moisture content is less than about 6 percent, preferably from about 3 to 5 percent.

The effectiveness of the treated sheets when employed together in conjunction with citrus fruit will depend, of course, on the amount of the chemical agents incorporated therein. In general, the respective amounts of the ammonium salts and the alkaline compound (dry basis) should be so adjusted that sufficient ammonia is liberated in the presence of moisture to insure adequate protection against damage by mold on citrus fruits over a period of time necessary for their shipping and storage. Preferably, the alkaline compound incorporated in one sheet should be in a stoichiometric amount, or in a slight excess thereof, required for a substantially complete reaction with the ammonium salt incorporated in the other sheet, i.e. substantially complete liberation of available ammonia. Broadly, the amount of either chemical present in the dry sheet may vary from about 1 to 150 pounds per ream, preferably from about 10 to 30 pounds per ream.

If desired, a certain amount of a suitable binder may be incorporated as an auxiliary constituent into either one or both sheets in order to avoid dusting of the dry chemical from the surface of the treated sheet. Particularly suitable binders for use in combination with the ammonium salt or the alkaline compound are water-soluble salts of alginic acid, examples of which are sodium, zinc and ammonium alginates. The binder may be conveniently added to the impregnating solution in amount of up to about 5 percent based on the dry weight of the chemical agent, preferably between 0.1 and 1 percent, or it may be applied as a separate treatment.

After the treated sheets or webs are dried, they may be brought together along a common path and joined into a unitary composite product by any suitable means, such by embossing, stapling, or by using a substantially water-free adhesive. Preferably, two separate webs of treated paper are passed together between a pair of embossing rolls which unite them in a composite sheet. Such sheet may be cut, if desired, to any adequate size suitable for use in packaging fruit. It is important that the composite sheets be protected from moisture prior to their use in conjunction with fruit. This may be accomplished by wrapping them in a moisture-vapor resistant wrapper, such as polyethylene, asphalt-laminated paper or the like.

When the finished preservative paper product, composed of at least one sheet treated with an ammonium salt and one sheet treated with an alkaline compound, is to be used for inhibiting mold growth on citrus fruit, it is placed in a suitable container either vented or nonvented, such as a carton, preferably in such a manner that the ammonium salt containing sheet will be in contact with the citrus fruit packed in the container. The ammonia will be gradually liberated from the paper product under the influence of moisture in the air. In a very dry climate, it may be desirable to spray or otherwise moisten the paper product prior to its placing in a container together with the fruit to be shipped. It will be understood that the amount of ammonia released and the rate of its liberation can be controlled by varying the amount of the two chemical agents incorporated in the paper product, as well as the number of the paper products placed in a container.

I have found it convenient to manufacture a composite paper product in form of a protective pad in the manner and by the means illustrated in the accompanying drawings which constitutes a part of this specification.

In the drawings:

Figure 1 is a diagrammatic representation of a suitable method of impregnating paper for use in the present invention.

Figure 2 is a similar diagrammatic representation of a method of assembling treated sheets.

Figures 3 through 5 are side views of assembled pads made in accordance with the present invention.

Referring now to the drawings by reference characters there is shown a roll 7 of untreated creped toweling paper 9 which is led over guide rolls 11 through a vat 13 containing an impregnating aqueous solution, out of the vat through a pair of squeeze rolls 15, passed through a hot air oven 17 and wound into a roll of treated paper 19. Thereafter, the faces of two treated webs 21 and 23 fed from two rolls 25 and 27, respectively, of paper impregnated separately in the above indicated manner are brought in the same path, passed together between a pair of embossing rolls 29, and thus joined as a unitary composite preservative paper product 31 and wound on roll 33. Paper may be withdrawn from roll 33 and cut to a desired size.

As shown in Figure 3, the final pad 35 may be formed from one sheet 37 treated with an ammonium salt and one sheet 39 treated with an alkaline compound. Alternatively, as shown in Figure 4, a pad may be composed of three sheets, two sheets 37 forming the outside with the sheet 39 being intermediate or, as shown in Figure 5, two outside sheets 39 with an intermediate sheet 37 may be employed in making the pad. It is also within the scope of this invention to form paper products comprising a plurality of treated sheets, provided that a sheet containing an ammonium salt is adjacent to a sheet containing an alkaline compound. Further, an untreated sheet may be employed as the outside sheet with at least two treated inner sheets if it is desired to prevent direct contact between the fruit and a treated sheet.

The following are some specific examples of the carrying out of the invention. It is to be understood, of course, that the invention is not limited by these specific examples.

EXAMPLE 1

Two webs of creped toweling having a basis weight of 32 pounds per ream and made of a pulp furnish comprising 70 percent bleached western hemlock sulfite and 30 percent unbleached western hemlock groundwood and containing 1 percent melamine-formaldehyde wet-strength resin, based on dry fiber, were impregnated separately with a 43 percent aqueous solution of ammonium sulfate heated to 100°–110° F. and with a 40 percent aqueous solution of sodium carbonate heated to 180°–190° F., respectively. The excess of each impregnating solution was squeezed out and the webs were substantially dried in a hot-air oven to a moisture content of about 5 percent. The impregnating conditions were so adjusted that the final sheets contained 19 pounds per ream of ammonium sulfate and 17 pounds per ream of sodium carbonate, dry fiber basis, respectively.

The treated webs were joined together by embossing in the manner described hereinabove to form a unitary composite web, which was subsequently cut to produce 11 in. × 17 in. pads.

Standard vented cartons were lined with three pads by placing two pads on the bottom and one pad on the top of the fruits after they have been packed. The fruits used were navel oranges and lemons previously inoculated with dry spore shower. As a control, the same fruits were packed in the same manner without the preservative pads. The cartons were closed and stored for 12 days in an iced car, followed by a 6-day storage at a temperature of 70°–75° F.

After the above period of time the fruits were examined for decay due to molding. The following Table I shows the results obtained.

*Table I*

|  | Percent of Decay ||
| --- | --- | --- |
|  | Oranges | Lemons |
| Control cartons | 98.3 | 98.6 |
| Cartons containing pads | 9.0 | 15.8 |

EXAMPLE 2

The materials and procedure employed in making the preservative pads were the same as in Example 1, except that 0.25 percent of sodium alginate based on the weight of sodium carbonate was dissolved in the alkaline compound containing impregnating solution.

The treated dry sheets contained 18 pounds per ream of ammonium sulfate and 23 pounds per ream of sodium carbonate, respectively. Inoculated oranges and lemons were packed in vented cartons with one pad placed on the bottom and one pad on the top of the fruits. The closed cartons were stored for one week in an iced car and one week at 60° F.

The examination of the packed fruits after the above period of storage gave the following results as shown in Table II.

*Table II*

|  | Percent of Decay ||
| --- | --- | --- |
|  | Oranges | Lemons |
| Control cartons | 16.3 | 12.5 |
| Cartons containing pads | 3.6 | 0.8 |

The use of a small amount of sodium alginate as a binder reduced appreciably dusting of the dry salt on the surface of the sheets during their handling. The binder did not produce any harmful effect on the control of mold growth on packaged fruit.

EXAMPLE 3

The materials and procedure employed in making the pads were the same as in Example 2, with the exception of incorporating additional 0.25 percent of sodium alginate, based on the ammonium sulfate, into the ammonium salt solution. The pads were positioned in the same manner as in Example 2 in non-vented standard cartons.

The results obtained are given in Table III.

*Table III*

|  | Percent Decay ||
| --- | --- | --- |
|  | Oranges | Lemons |
| Control cartons | 27.3 | 15.9 |
| Cartons containing pads | 3.2 | 0.5 |

EXAMPLES 4–7

The procedure of Example 1 was repeated except that the impregnating aqueous solutions were prepared at room temperature. The following Table IV shows the specific ammonium salts and alkaline compounds used, their concentrations in aqueous solutions, and their amounts in the final dry sheets.

*Table IV*

| Example | Compounds | Concentration (Percent) | Dry Weight, lbs./ream |
| --- | --- | --- | --- |
| 4 | Ammonium oxalate | 11.8 | 6 |
|  | Sodium metaborate | 10.9 | 5 |
| 5 | Ammonium oxalate | 11.8 | 6 |
|  | Potassium hydroxide | 9.3 | 4.5 |
| 6 | Ammonium chloride | 26.2 | 13 |
|  | Potassium hydroxide | 27.4 | 13.5 |
| 7 | Ammonium chloride | 26.2 | 13 |
|  | Sodium metaborate | 32.2 | 16 |

From the above examples, it is apparent that the preservative fibrous cellulosic products of this invention are highly satisfactory in controlling or inhibiting mold growth on fruits. The superior fungistatic characteristics of the composite protective pads give them a long sought property of slowly releasing ammonia in the presence of moisture thus preventing molding on the fruits during their storage or in transit. Furthermore, the chemicals employed in the concentrations and amounts hereinabove described are believed to be nontoxic and give adequate protection for most requirements.

I claim:

1. A preservative fibrous cellulosic product adapted for use in the control of mold growth on fruits and vegetables comprising at least one sheet containing a stable ammonium salt and at least one other sheet in contact therewith containing an alkaline compound capable of liberating ammonia from said ammonium salt upon bringing said sheets in contact with each other in the presence of moisture.

2. A preservative paper product adapted for use in the control of mold growth on citrus fruits comprising at least one paper sheet containing a stable ammonium salt and at least one other sheet in contact therewith containing an alkaline compound capable of liberating ammonia from said ammonium salt upon bringing said sheets in contact with each other in the presence of moisture.

3. The paper product of claim 2, wherein the alkaline compound in an alkali metal salt.

4. The paper product of claim 2 wherein the alkaline compound present in one sheet is at least in a stoichiometric amount required for substantially complete reaction with the ammonium salt present in the other sheet.

5. The paper product of claim 4 wherein the respective amounts of the ammonium salt and of the alkaline compound present in each sheet are from about 1 pound to about 150 pounds per ream of dry paper.

6. The paper product of claim 4 wherein the respective amounts of the ammonium salt and of the alkaline compound present in each sheet are from about 10 pounds to about 30 pounds per ream of dry paper.

7. The paper product of claim 5 wherein at least one sheet contains up to about 5 percent by weight of a water-soluble salt of alginic acid, based on the dry weight of the ammonium salt or the alkaline salt.

8. The paper product of claim 7 wherein the amount of a salt of alginic acid is from about 0.1 percent to 1 percent.

9. A composite paper pad comprising an absorbent paper sheet containing a stable ammonium salt and united to at least one face thereof an absorbent paper sheet containing an alkali metal salt, said salts being capable of reacting with each other in the presence of moisture to slowly liberate ammonia in amount sufficient to control molding of packaged citrus fruit during storage and shipment.

10. The paper pad of claim 9 wherein at least one sheet contains a water-soluble salt of alginic acid in amount up to about 5 percent based on the dry weight of the ammonium salt or the alkaline metal salt.

11. A composite paper pad adapted to protect citrus fruit from damage due to mold growth and rough handling during storage and shipment comprising an absorbent sheet treated with a stable ammonium salt and united to at least one face thereof an absorbent sheet treated with an alkaline metal salt capable of liberating ammonia from said ammonium salt in the presence of moisture, the respective amounts of the ammonium salt and the alkaline metal salt being from about 1 pound to about 150 pounds per ream of dry paper and the alkaline metal salt being present in at least the stoichiometric amount required for substantially complete reaction with the ammonium salt.

12. The process of making preservative fibrous cellulosic product adapted for use in the control of mold growth on fruits and vegetables which comprises treating a first fibrous sheet with an aqueous solution of a stable ammonium salt and substantially drying said sheet, treating a second fibrous sheet with an aqueous solution of an alkaline compound capable of liberating ammonia from said ammonia salt in the presence of moisture and substantially drying said second sheet, and bringing at least one face of said first sheet in contact with a face of the second sheet.

13. The process of making preservative paper product adapted for use in the control of mold growth on citrus fruits which comprises impregnating a first paper sheet with an aqueous solution of a stable ammonium salt and substantially drying said sheet, impregnating a second paper sheet with an aqueous solution of an alkaline compound capable of liberating ammonia from said ammonium salt in the presence of moisture and substantially drying said second sheet, and bringing at least one face of said first sheet in contact with a face of the second sheet.

14. The process of claim 13 wherein the alkaline compound is an alkali metal salt.

15. The process of claim 13 wherein the alkaline compound incorporated in the second sheet is at least in a stoichiometric amount required for substantially complete reaction with the ammonium salt incorporated in the first sheet.

16. The process of making a composite paper pad adapted to protect citrus fruits from damage due to mold growth and rough handling during storage and shipment which comprises displacing two absorbent paper sheets from two separate rolls, impregnating a first sheet with an aqueous solution of a stable ammonium salt, impregnating a second sheet with an aqueous solution of an alkaline metal salt capable of liberating ammonia from said ammonium salt in the presence of moisture, substantially drying said sheets, bringing said sheets together along a common path and uniting said sheets into a composite pad.

References Cited in the file of this patent

UNITED STATES PATENTS

| | | |
|---|---|---|
| 78,112 | Mariner | May 19, 1868 |
| 2,043,351 | Fourness et al. | June 9, 1936 |
| 2,185,954 | Ryner | Jan. 2, 1940 |

FOREIGN PATENTS

| | | |
|---|---|---|
| 517,079 | Great Britain | Jan. 19, 1940 |
| 103,902 | Australia | May 19, 1938 |

OTHER REFERENCES

Merck Index, 6th ed., Merck and Co., Rahway, N.J., 1952, pp. 29 and 870.